(12) United States Patent
Konetski et al.

(10) Patent No.: US 8,898,797 B2
(45) Date of Patent: Nov. 25, 2014

(54) SECURE OPTION ROM FIRMWARE UPDATES

(75) Inventors: David Konetski, Austin, TX (US); Frank Molsberry, Georgetown, TX (US); Ricardo L. Martinez, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 129 days.

(21) Appl. No.: 13/445,363

(22) Filed: Apr. 12, 2012

(65) Prior Publication Data

US 2013/0276128 A1  Oct. 17, 2013

(51) Int. Cl.
G06F 17/30 (2006.01)
H04N 7/16 (2011.01)
G06F 21/10 (2013.01)
G06F 12/14 (2006.01)
G06F 15/173 (2006.01)
H04L 29/06 (2006.01)

(52) U.S. Cl.
CPC .............. *G06F 21/10* (2013.01); *H04L 63/0428* (2013.01)
USPC .................. 726/26; 713/2; 713/191; 709/225

(58) Field of Classification Search
CPC .............. G06F 21/10; G11B 20/00086; G11B 20/0021; H04L 63/0428; H04N 21/4405
USPC ............ 726/26, 2–8; 713/168–174, 182–186, 713/202; 709/225, 229
See application file for complete search history.

(56) References Cited

U.S. PATENT DOCUMENTS

| | | | |
|---|---|---|---|
| 7,644,259 B2 | 1/2010 | Henning et al. | |
| 2007/0204144 A1* | 8/2007 | Gafken et al. | 713/2 |
| 2008/0270781 A1 | 10/2008 | Ibrahim et al. | |
| 2009/0070593 A1 | 3/2009 | Boshra et al. | |
| 2009/0271600 A1* | 10/2009 | Joshi et al. | 713/2 |
| 2010/0058306 A1* | 3/2010 | Liles et al. | 717/168 |
| 2010/0299749 A1 | 11/2010 | Bhansali et al. | |

* cited by examiner

*Primary Examiner* — Ashokkumar Patel
*Assistant Examiner* — Evans Desrosiers
(74) *Attorney, Agent, or Firm* — Terrile, Cannatti, Chambers & Holland, LLP; Robert W. Holland

(57) ABSTRACT

Option ROM updates are performed in a secure manner with centralized control through system initialization firmware, such as the system BIOS. An option ROM updater manages copying an option ROM update to an auxiliary subsystem if an update bit is set, such as by a secure system management interface with the BIOS. Upon detection of an update bit, the option ROM updater unlocks a write protect at the auxiliary subsystem firmware and copies an option ROM update to the auxiliary subsystem to update the option ROM. After completing the option ROM update, the option ROM updater locks write protection of the option ROM to maintain system security.

17 Claims, 2 Drawing Sheets

SECURE OPTION ROM FIRMWARE UPDATES

BACKGROUND OF THE INVENTION

1. Field of the Invention

The present invention relates in general to the field of information handling system firmware updates, and more particularly to information handling system secure option ROM firmware updates.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically built from a variety of components that cooperate to process information. For example, a central processing unit (CPU) runs applications to perform desired functions, such as word processing, multimedia content presentation, web browsing and e-mail. End users interact with applications through a variety of auxiliary subsystems built from the components. Auxiliary subsystems input information for use by the applications and present information processed by the applications. Some examples of auxiliary subsystems include a video subsystem that processes information to generate visual image information for presentation at a display, SCSI subsystems that support communications with storage devices such as hard disk drives and optical drives, and network subsystems that support communications with networks to perform functions such as a PXE network boot.

Information handling systems typically coordinate the interaction between applications running on a CPU and physical components with an operating system that also runs on the CPU. In addition, information handling systems generally have a system boot and initialization firmware architecture that provides the operating system with access to physical components, such as a Basic Input/Output System (BIOS). The BIOS is a set of firmware instructions that run on physical components generally referred to as the chipset. During initialization up of an information handling system, the BIOS coordinates a boot of the operating system from persistent storage, such as a hard disk drive, to an operational state running on the CPU and also typically stored in random access memory (RAM) interfaced with the CPU. In addition to the BIOS, other firmware instructions known as option ROMs are typically included to support operation of auxiliary subsystems. Option ROMs are autonomous pieces of firmware which control the boot and configuration of auxiliary subsystems within a platform and in some instances also serve as runtime code for some types of subsystems. For example, a video BIOS option ROM is typically loaded early in boot to coordinate operations of the video subsystem with the main BIOS and operating system so that information can be presented at a display. Other examples of option ROMS include a SCSI BIOS option ROM that makes storage devices visible to other components during boot and a network boot ROM, such as a PXE option ROM that supports boot of the information handling system from a network interface.

One difficulty with information handling systems is that malicious code executing on a physical component can compromise information stored on an information handling system and can even lead to failure of the information handling system. Although malicious code is most commonly targeted at applications and operating systems running on an information handling system, successful attacks by malicious code on an information handling system's firmware presents a high risk because firmware runs at a more privileged level than most anti-malware tools available today. In response to the threat presented by malicious software attacks on firmware, a number of secure platform initiatives have been initiated, such as NIST 800-147, which strive to protect the main platform BIOS from malicious attack. However, these efforts generally do not address security issues related to all pieces of firmware, such as option ROMs.

Some efforts are made to protect option ROMs from malicious code during updates of option ROM firmware. One way of protecting option ROMs is to write-protect the option ROM to prevent any updates to the firmware code. Another way to protect option ROMs is to allow updates only through an option ROM subsystem code which initiates an update and connects directly with an update source. A third way to protect option ROMs is to program option ROM firmware to allow an update cycle to be initiated by the host platform CPU. Having a write-protect that prevents any updates limits maintenance options for the option ROM, such as to respond to difficulties that might arise over time with the execution of firmware instructions on different types of platforms. Allowing updates managed by an external network location or a host CPU will provide option ROM maintenance but also offer attack surfaces, such as reliance on third party suppliers to provide safe updates and a secure delivery mechanism.

SUMMARY OF THE INVENTION

Therefore a need has arisen for a system and method which supports secure option ROM firmware updates.

In accordance with the present invention, a system and method are provided which substantially reduce the disadvantages and problems associated with previous methods and systems for performing option ROM firmware updates. Secure option ROM updates are managed with an option ROM updater that executes in conjunction with information handling system initialization firmware in a centralized manner.

More specifically, an information handling system is built from plural processing components that cooperate to process information. System initialization firmware, such as a BIOS, checks for an option ROM update enable bit upon system initialization and responds to detection of a bit by retrieving an option ROM update from a predetermined memory location for execution at the BIOS. The option ROM update executes an updater that writes updated option ROM firmware instructions to an auxiliary subsystem associated with the option ROM update enable bits. The option ROM updater uses a secure key to unlock a write protect of flash memory on the auxiliary subsystem that stores the option ROM so that the updated option ROM instructions can be written to the flash memory. After the updated option ROM instructions are written, the flash memory write protect is re-locked to prevent unauthorized tampering with the option ROM.

The present invention provides a number of important technical advantages. One example of an important technical advantage is that secure option ROM updates are provided with a deterministic methodology that ensures the pedigree and robustness of information handling system firmware. Centralized control of option ROM firmware updates reduces the reliance upon third parties and suppliers to deliver secure code and increases the assurance that firmware introduced for option ROM updates does not include malicious code. Option ROMs appear write-protected to any malicious code that attempts to corrupt an option ROM, however, the ability to update the option ROM remains available with an update mechanism of the BIOS that authorizes removal of the write protect. Option ROM updates initiated with an update bit at the BIOS provide flexibility to maintain information handling system auxiliary subsystems while reducing the risk of entry of malicious code at the firmware level of the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system option ROMs are updated in a secure manner with initialization firmware management. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
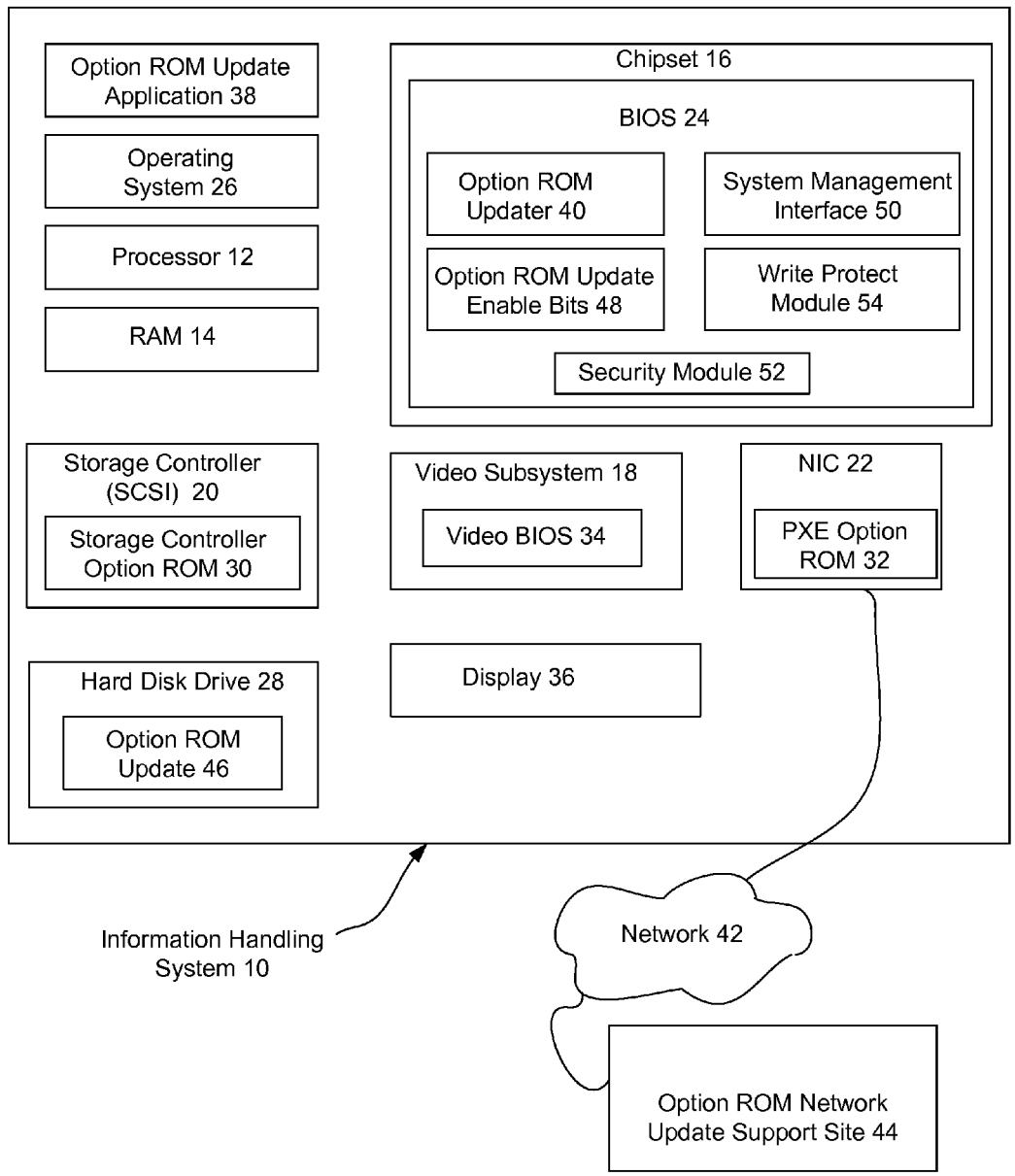
FIG. 1 depicts a block diagram of a system for secure option ROM updates.

Referring now to FIG. 1, a block diagram depicts a system for secure option ROM updates. An information handling system 10 processes information with plural components, such as a processor 12 that executes instructions and a memory 14 that stores instructions in support of operations performed on processor 12. A chipset 16 interfaces with processor 12 to coordinate communication on a physical level between processor 12 and other components of the information handling system, such as a video subsystem 18, a storage controller 20 and a network interface card 22, each of which are auxiliary subsystems of information handling system 10. Chipset 16 includes a variety of integrated circuits and flash memory that execute and store firmware instructions for managing physical components of information handling system 10. For example, a basic input/output system (BIOS) 24 stored as firmware in chipset 16 executes to initialize information handling system to an operational state, such as upon initial power-up.

During initialization, BIOS 24 retrieves an operating system 26 from persistent memory to run on processor 12, such as by retrieving the operating system from a hard disk drive 28 or from a network location with network interface card 22. A storage controller option ROM 30 executing on storage controller 20 initializes operation of storage controller 20 to provide communication between BIOS 24 and hard disk drive 28, such as with an SCSI protocol. Alternatively, PXE option ROM 32 executing on network interface card 22 initializes operation of network interface card 22 to provide communication between BIOS 24 and a network storage location having operating system 26 to support a PXE boot. During initialization, of information handling system 10, a video subsystem option ROM 34, also known as a video BIOS, executes on video subsystem 18 to establish communication with BIOS 24 and present information from BIOS 24 at a display 36.

An option ROM update application 38 running over operating system 26 and an option ROM updater running on chipset 16 with BIOS 24 cooperate in order to update option ROMs stored in firmware of auxiliary subsystems, such as storage controller option ROM 30, PXE option ROM 32 and video BIOS option ROM 34. Operation ROM update application 38 retrieves option ROM updates and stores the option ROM updates in memory, such as an update capsule pre-primed on information handling system 10 or a defined location in memory, like a predetermined location in SMM, in RAM 14 or in hard disk drive 28. For example, option ROM update application 38 periodically inquires through network 42, such as the Internet, with an option ROM update network location 44 to identify and download option ROM updates for auxiliary subsystems of information handling system 10. Once an option ROM update is retrieved and stored in memory, such as option ROM update 46 stored in hard disk drive 28, option ROM update application 38 sets option ROM update enable bits 48 in BIOS 24 for detection upon the next boot of information handling system 10. In one embodiment, option ROM update application 38 initiates a boot of information handling system 10 once option ROM update enable bits 48 are set so that the option ROM update begins with system initialization by BIOS 24. In an alternative embodiment, some or all of the functions of option ROM update application 38 are performed through BIOS 24 to further enhance option ROM update security. For instance, an end user interacts with BIOS 24 to set option ROM update enable bits 48 through a system management interface 50 presented by BIOS 24 so that option ROM update enable bits 48 are not selectable through an application running over operating system 26, which typically has a greater risk of malware attacks than BIOS 24.

Once option ROM update enable bits 48 are set to identify an option ROM update for an auxiliary subsystem option ROM, a boot of information handling system 10 begins initialization of BIOS 24 and execution of option ROM updater 40 in conjunction with BIOS 24. Option ROM updater 40 checks the option ROM update enable bits 48 to determine whether an option ROM update is available for execution on an auxiliary subsystem before BIOS 24 initializes operating system 26. If an option ROM update enable bit 48 is set, then option ROM updater 40 initiates installation of the option ROM update on the auxiliary subsystem. In one embodiment, the identity of the option ROM update enable bit provides option ROM updater 40 with the identity of the auxiliary subsystem having an option ROM update for installation. Option ROM updater 40 first locates the option update from memory. In one embodiment, option ROM updater 40 retrieves a secure network address, such as a URL, from the option ROM stored on the auxiliary subsystem and retrieves an option ROM update from the network location. In another embodiment, option ROM updater 40 retrieves a memory address from the option ROM stored on the auxiliary subsystem that defines where updates are stored in memory of information handling system 10, such as predefined address in hard disk drive 28.

Once option ROM updater 40 has located the option ROM update associated with an update enable bit 48 set in BIOS 24, option ROM updater 40 executes a security module 52 to authenticate the option ROM update so that malware is not inadvertently copied to the auxiliary subsystem with an update. For example, security module 52 authenticates the option ROM update with a PKI infrastructure, a secure hash delivered with the option ROM update or an inherent trust of a secure code repository confirmed by security module 52. Once security module 52 confirms the authenticity of an option ROM update, security module 52 provides a key to a write-protect module 54 that locks and unlocks write protection of flash memory that stores the option ROM of the auxiliary subsystem subject to an option ROM update. During normal operations of information handling system 10, write protect module 54 locks write protection at the auxiliary subsystem so that other systems cannot write to the flash memory of the auxiliary subsystem. When an update is authenticated by security module 52, write protect module 54 receives a secure key to unlock write protection at the auxiliary subsystem and option ROM updater 40 copies option ROM update 46 from memory to the auxiliary subsystem. Once the option ROM update is complete, the hash of the option ROM is confirmed and then write protect module 54 locks write protection of the auxiliary subsystem.

Option ROM updater 40 may include distributed modules that cooperate between hardware components to install an option ROM update. In one embodiment, option ROM updater logic residing on chipset 16 with BIOS 24 initially only checks for update enable bits 48 to determine that an option ROM update is ready. Other logic for preparing option ROM firmware instructions and writing the firmware instructions to flash memory of an auxiliary subsystem are stored in option ROM update 46 and executed on either BIOS 24 or on the auxiliary subsystem itself. For example, logic of option ROM updater 40 detects an update enable bit 48 and, in response, retrieves option ROM update 46 to BIOS 24. Option ROM update 46 includes additional logic of option ROM update 40, which executes at the BIOS to write option ROM update firmware instructions to the auxiliary subsystem option ROM being updated. In alternative embodiments, option ROM updater can have logical modules disposed across other hardware and firmware components. Option ROM updater 40 can include standardized functions to unlock write protection of an option ROM and to execute an option ROM code update. Alternatively, each auxiliary subsystem that has an updateable option ROM provides its update code upon first enumeration at an information handling system platform, such as for storage in BIOS 24 for use when an option ROM update bit is set.

Figure 2:
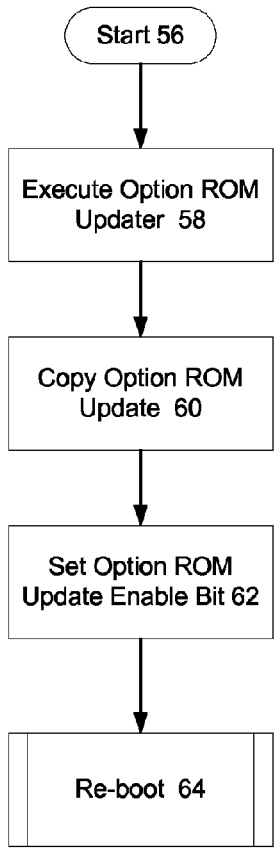
FIG. 2 depicts a flow diagram of a process for setting an information handling system BIOS option ROM update enable bits.

Referring now to FIG. 2, a flow diagram depicts a process for setting an information handling system BIOS option ROM update enable bits. The process begins at step 56 with initiation of an option ROM update application running over the operating system. At step 58, the option ROM update application executes to determine that an option ROM update exists for an auxiliary subsystem of the information handling system. At step 60, the option ROM update is retrieved and copied to a predetermined memory location, such as a defined address of a hard disk drive on the information handling system. At step 62, the option ROM update application sets an option ROM update enable bit for the BIOS to read on the next initialization of the information handling system. At step 64, the option ROM update application initiates a reboot of the information handling system, such as by requesting an end user to re-boot to install the new option ROM.

Figure 3:
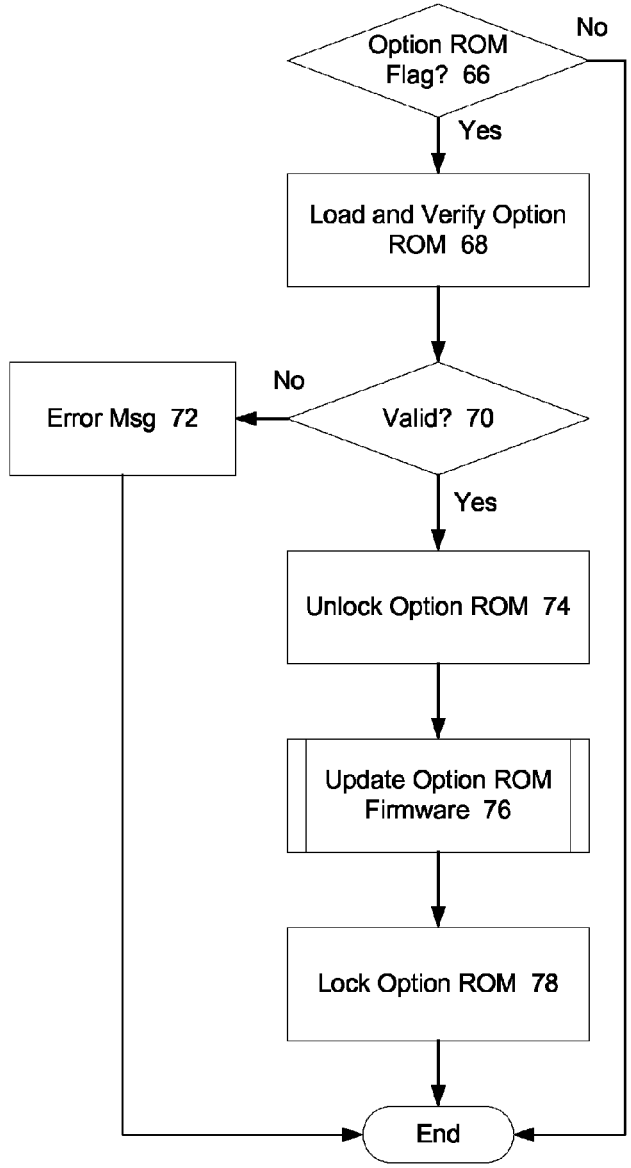
FIG. 3 depicts a flow diagram of a process for securely updating an option ROM.

Referring now to FIG. 3, a flow diagram depicts a process for securely updating an option ROM. The process begins at step 66 with detection upon system initialization of an option ROM update enable bit set in the BIOS or other system initialization firmware. At step 68, the option ROM update is loaded to the initialization firmware for execution, such as on a processor within the system chipset that supports the BIOS. At step 70 a determination is made of whether the option ROM update is authentic, such as by comparison with a secure hash in the option ROM update. If the option ROM update is not authentic, the process continues to step 72 to issue an option ROM update failure message and ends at step 80. If the determination at step 70 is that the option ROM is authentic, the process continues to step 74 to unlock the write protect of the flash memory that stores the option ROM. At step 76, the option ROM updater executing with the BIOS updates the option ROM firmware by writing the updated firmware in the flash memory of the auxiliary subsystem. At step 78, once the option ROM update is written to the auxiliary subsystem, the firmware write protection is re-enabled to prevent unauthorized changes to the option ROM, and the process ends at step 80.

Although the present invention has been described in detail, it should be understood that various changes, substitutions and alterations can be made hereto without departing from the spirit and scope of the invention as defined by the appended claims.

What is claimed is:
1. An information handling system comprising:
a processor operable to execute instructions;
memory interfaced with the processor and operable to store the instructions;
a chipset operable to store and execute firmware;
a Basic Input or Output System (BIOS) stored in the chipset and operable to execute on the chipset;
an auxiliary subsystem separate from the chipset and interfaced with the BIOS, the auxiliary subsystem performing an auxiliary function with option Read Only Memory (ROM) firmware instructions stored on the auxiliary subsystem;
a write protect module stored on the auxiliary subsystem and selectively locking and unlocking a write protect of the option ROM firmware instructions; and an option ROM updater stored in the chipset and interfaced with the BIOS, the option ROM updater detecting an option ROM update bit set at the BIOS and in response to detecting the option ROM update bit to unlocking the write protect and to load an option ROM update from a predetermined location to the auxiliary subsystem to write updated option ROM firmware instructions on the auxiliary subsystem;

wherein the option ROM updater is further operable to detect completion of the writing of the option ROM firmware instructions and in response to detecting completion to lock the write protect of the option ROM firmware instructions; and wherein the predetermined location comprises a network location stored in the auxiliary subsystem and wherein the option ROM updater retrieves the network location from the auxiliary subsystem upon detection of the option ROM update bit.

2. The information handling system of claim 1 wherein the auxiliary subsystem comprises a graphics subsystem operable to process information into visual information for presenting images at a display.

3. The information handling system of claim 1 wherein the auxiliary subsystem comprises a storage controller operable to coordinate communication with one or more storage devices.

4. The information handling system of claim 1 wherein the predetermined location comprises a defined memory location in a hard disk drive incorporated in the information handling system.

5. The information handling system of claim 1 further comprising a systems management interface executing on the chipset and operable to accept user inputs through the BIOS to set one or more option ROM update bits.

6. The information handling system of claim 1 further comprising a security module operable to analyze the option ROM update for authenticity before loading the option ROM update to the auxiliary subsystem.

7. A method for updating an option Read Only Memory (ROM) of an information handling system, the method comprising:

setting an option ROM update bit in initialization firmware executing on a chipset;

executing the initialization firmware;

detecting the option ROM update bit with the initialization firmware;

in response to detecting, copying an option ROM update from a predetermined location to the initialization firmware, the predetermined location comprising a network location stored in the auxiliary subsystem, the option ROM update retrieved from the network location;

updating the option ROM at an option ROM device with the option ROM update, the option ROM device separate from the chipset; and completing executing the initialization firmware to bring the information handling system to an operational state with the update installed on the option ROM.

8. The method of claim 7 further comprising authenticating the option ROM update before updating the option ROM.

9. The method of claim 8 wherein authenticating the option ROM update further comprises:

performing a hash of the option ROM with the initialization firmware; and comparing the hash with a secure hash stored in the option ROM update.

10. The method of claim 7 wherein the initialization firmware comprises a BIOS and setting an option ROM update bit further comprises communicating the option ROM update bit to the BIOS through a secure system management interface.

11. The method of claim 7 wherein the predetermined location comprises a network location having an address, the address stored in the option ROM.

12. The method of claim 7 wherein the predetermined location comprises a predefined location in memory of the information handling system.

13. The method of claim 7 further comprising:

write protecting the option ROM;

in response to detecting, removing the write protect from the option ROM with the initialization firmware; and in response to the updating the option ROM, re-establishing the write protect with the initialization firmware.

14. The method of claim 7 wherein the option ROM comprises a storage controller operable to establish communications with storage devices during initialization of the information handling system.

15. A system for updating an option Read Only Memory (ROM) that manages an information handling system auxiliary subsystem, the system comprising:

an auxiliary subsystem processor disposed in the auxiliary subsystem and operable to lock and unlock a write protect of an option ROM integrated in the auxiliary subsystem; and an option ROM updater stored within initialization firmware to run on an initialization processor separate from the auxiliary subsystem processor, the option ROM updater interfaced with the auxiliary subsystem processor, the option ROM updater detecting an option ROM update bit set in initialization firmware instructions and in response to detecting the option ROM update bit unlocking the write protect and to load an option ROM update from a predetermined location to the auxiliary subsystem, the option ROM update having updated option ROM firmware instructions for execution on the auxiliary subsystem processor;

wherein the predetermined location comprises a network location stored in the auxiliary subsystem and wherein the option ROM updater retrieves the network location from the auxiliary subsystem upon detection of the option ROM update bit.

16. The system of claim 15 wherein the option ROM updater is further operable to lock the option ROM write protect upon completing the write of updated option ROM firmware instructions to the auxiliary subsystem.

17. The system of claim 16 wherein the predetermined location comprises a defined location in memory of the information handling system.

* * * * *